(12) United States Patent
Hui

(10) Patent No.: US 6,619,128 B1
(45) Date of Patent: Sep. 16, 2003

(54) PRESSURE GAUGE FOR TOY WATER GUN

(75) Inventor: Shuk-Tin Hui, Hong Kong (CN)

(73) Assignee: Imagine Company Limited, Tortola (VG)

( * ) Notice: Subject to any disclaimer, the term of this patent is extended or adjusted under 35 U.S.C. 154(b) by 0 days.

(21) Appl. No.: 10/222,437

(22) Filed: Aug. 16, 2002

(51) Int. Cl.$^7$ ................................................ G01L 9/00
(52) U.S. Cl. .......................... 73/705; 73/705; 73/714; 73/756
(58) Field of Search .......................... 73/705, 714, 756, 73/753; 446/175, 211, 473, 483; 222/79

(56) References Cited

U.S. PATENT DOCUMENTS

| | | | | |
|---|---|---|---|---|
| 4,869,701 A | * | 9/1989 | Kawai et al. ................. | 446/91 |
| 5,685,484 A | * | 11/1997 | Dehnad ........................ | 239/99 |
| 6,234,347 B1 | * | 5/2001 | Amron ......................... | 222/1 |
| 6,247,995 B1 | * | 6/2001 | Bryan ......................... | 446/473 |

* cited by examiner

Primary Examiner—William Oen
(74) Attorney, Agent, or Firm—Alix, Yale & Ristas, LLP

(57) ABSTRACT

A pressure gauge device for a toy water gun having a pressure chamber, includes a housing, a light source mounted to the housing, a coloured transparency mounted movably to the housing, a pneumatic actuator communicating with the chamber and moving the transparency, and a display receiving light from the light source that has passed through the transparency.

7 Claims, 4 Drawing Sheets

PRESSURE GAUGE FOR TOY WATER GUN

BACKGROUND OF THE INVENTION

The present invention relates to pressure gauges. More particularly, although not exclusively, the invention relates to a pressure gauge for a toy water gun.

Some "high-powered" toy water guns have a pressurised water chamber. A single held-down depression of a trigger will result in a continuous stream of water being ejected from the gun's nozzle until such time as water in the chamber is depleted or air pressure in the chamber egualises with the ambient atmospheric pressure. Air pressure is increased in the chamber by a manually reciprocal pump action device.

Is it known to provide a convenient pressure gauge on such toy water guns to display the air pressure within the chamber. The known device comprises a pivotally mounted needle upon a dial or face. The shaft from which the needle extends has a pinion gear in mesh with a moving rack in turn associated with a spring-loaded plunger connected pneumatically with the chamber.

Such a pressure gauge, although useful during daylight hours is of little use at night time when children might be playing "war games" in the dark.

OBJECTS OF THE INVENTION

It is an object of the present invention to overcome or substantially ameliorate the above disadvantage and/or more generally to provide an alternative pressure gauge, useful in toy water guns or other applications including toys.

DISCLOSURE OF THE INVENTION

There is disclosed herein a pressure gauge device for a toy having a pressure chamber, the device comprising:
 a housing,
 a light source mounted to the housing,
 a coloured transparency mounted movably to the housing,
 a pneumatic actuator communicating with the chamber and moving the transparency, and
 a display receiving light from the light source that has passed through the transparency.

Preferably the transparency is a multi-coloured disk.

Preferably the disk is mounted upon a shaft.

Preferably the shaft has a pinion gear mounted thereon and the pneumatic actuator has a spring-biased plunger having a rack moving therewith and in mesh with the pinion gear.

Preferably the display comprises a number of light-transmissive tubes extending from alongside the transparency.

Preferably the housing includes a back part to which the light source and disk are mounted, an intermediate part adjacent to the transparency, and a front part including the display.

Preferably the pneumatic actuator is mounted to the back part externally of the device.

DEFINITION

As used herein, the term "transparency" is intended to mean something that transmits light and affects the light in some way. It is not necessarily transparent, as it is most likely translucent at least in part.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
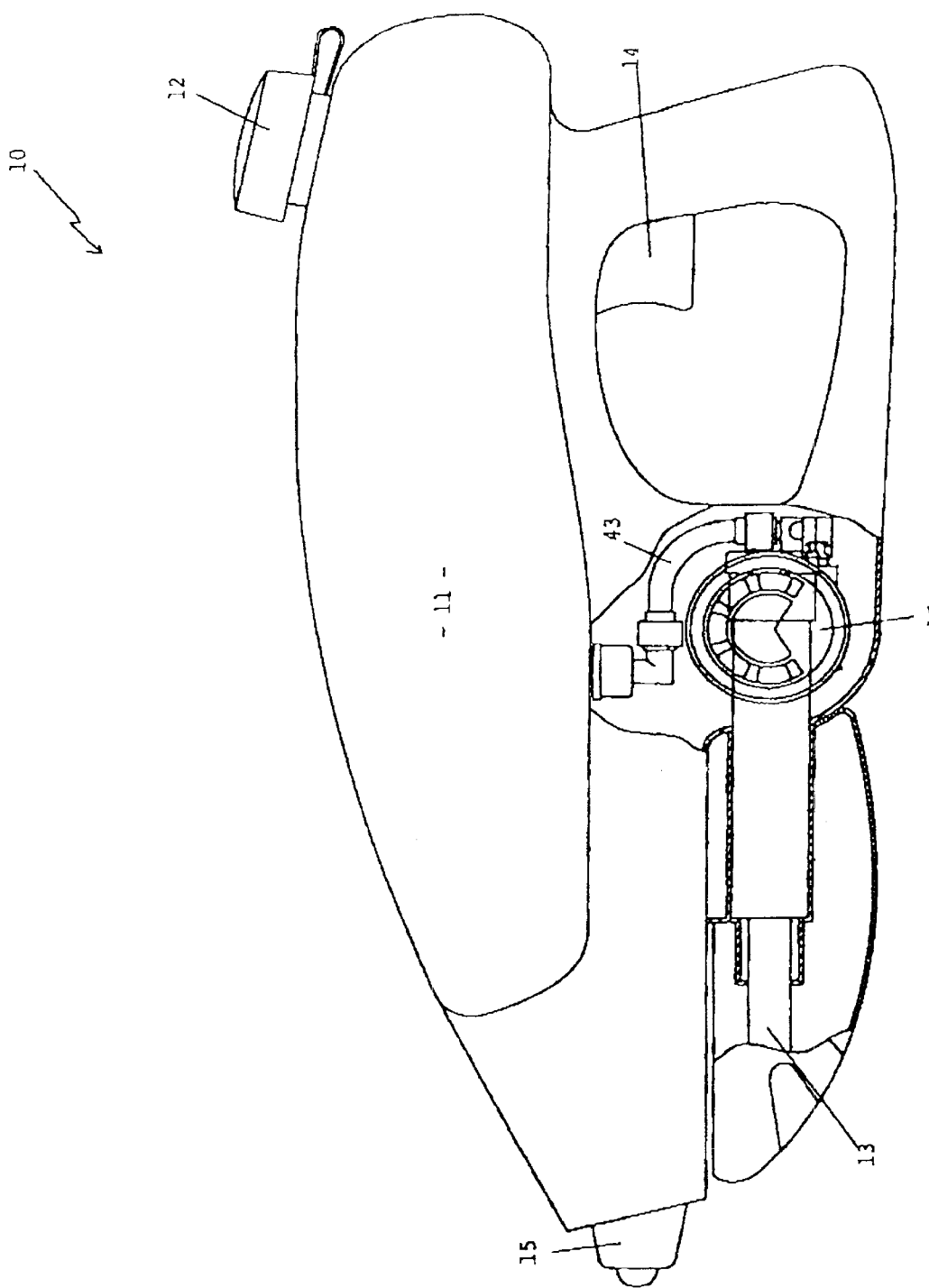
FIG. 1 is a schematic partially cross-sectioned side elevational view of a toy water gun.
Figure 2:
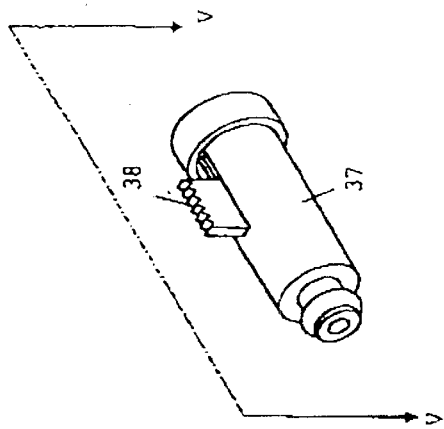
FIG. 2 is a schematic perspective illustration of a pressure gauge.
Figure 4:
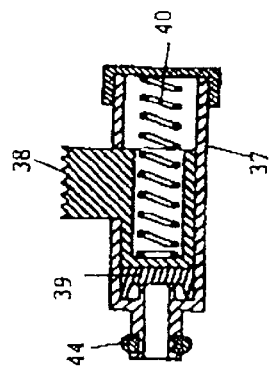
FIG. 4 is a schematic perspective illustration of a pneumatic actuator.
Figure 3:
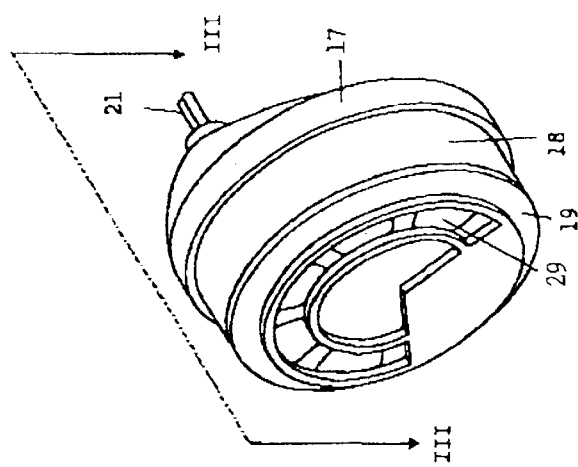
FIG. 3 is a schematic cross-sectional illustration of the pressure gauge of FIG. 2 taken at III—III in FIG. 2.
Figure 5:
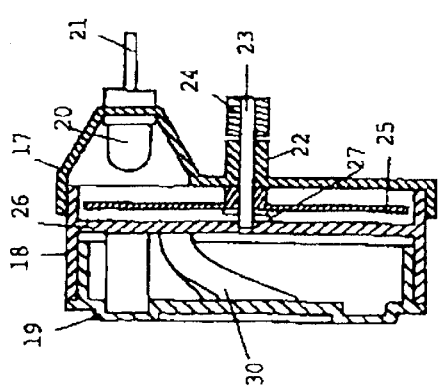
FIG. 5 is a schematic cross-sectional illustration of the pneumatic actuator of FIG. 4 taken at V—V in FIG. 4.

In FIG. 1 of the accompanying drawings there is schematically depicted a toy water gun 10. Water gun 10 includes a chamber 11 that receives water via a cap 12. The chamber 11 can be pressurised upon reciprocal movement of a pumping piston 13 in a known manner. A trigger 14 can be depressed and held down to result in ejection of squirted water via nozzle 15. Trigger 14 opens a valve to allow pressure within chamber 11 to force water through the nozzle 15 in a known manner.

A pressure-indicating gauge 16 is mounted to the side of the toy gun 10 forward of the trigger 14. Components of the pressure gauge are illustrated in the remaining drawing figures.

The pressure gauge 16 includes a housing made up of a back part 17, an intermediate part 18 and a front part 19, all of which are typically fabricated from moulded plastics material.

The back part houses a light globe 20 receiving current from a battery (not shown) via a pair of electrical conductors 21 and a switch (also not shown). The battery would be housed somewhere within the toy gun 10 and the switch would he somewhere on the toy gun exterior or on the pressure gauge itself.

Figure 6:
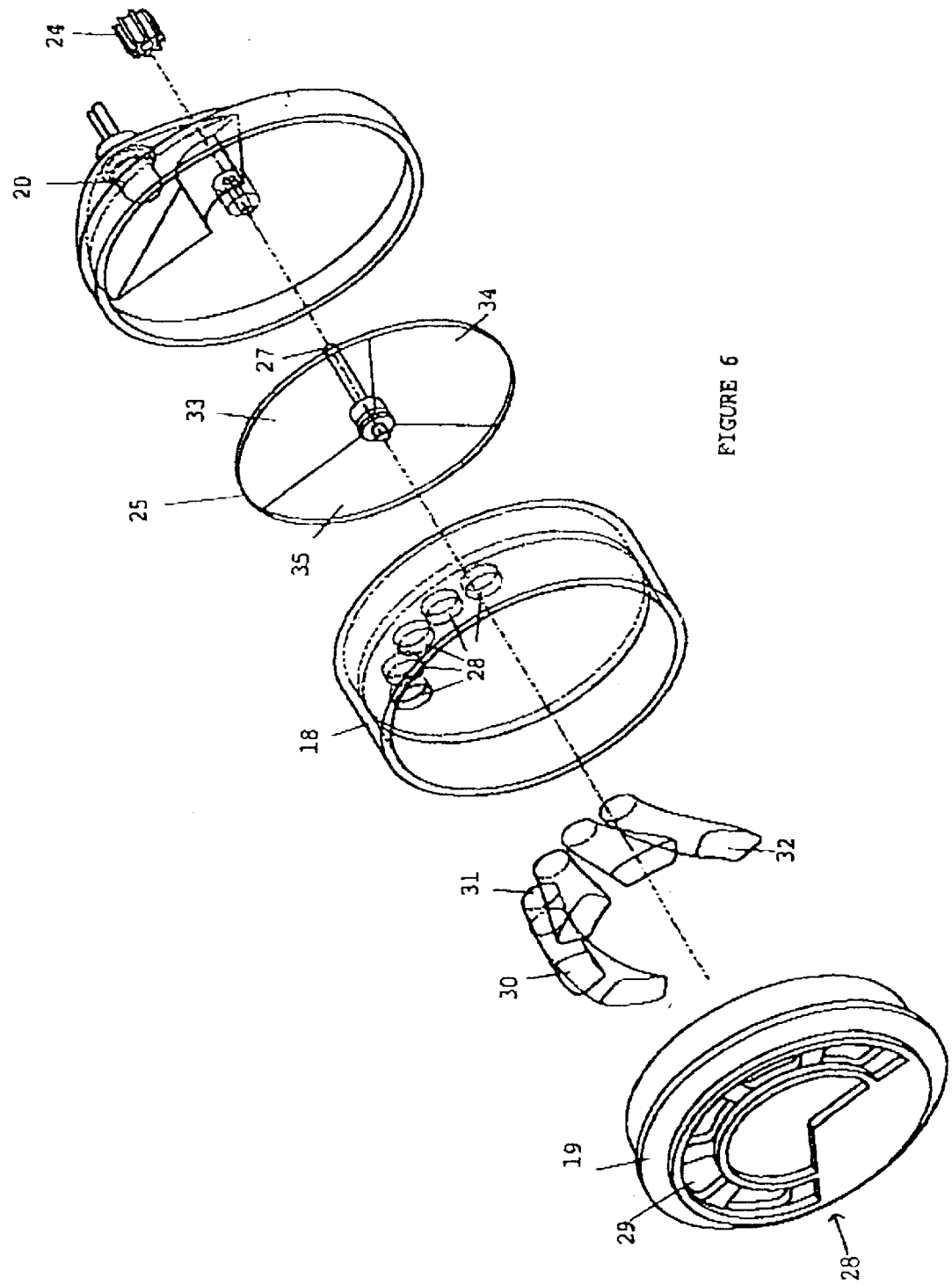
FIG. 6 is a schematic parts-exploded perspective illustration of the pressure gauge of FIG. 2.
Figure 7:
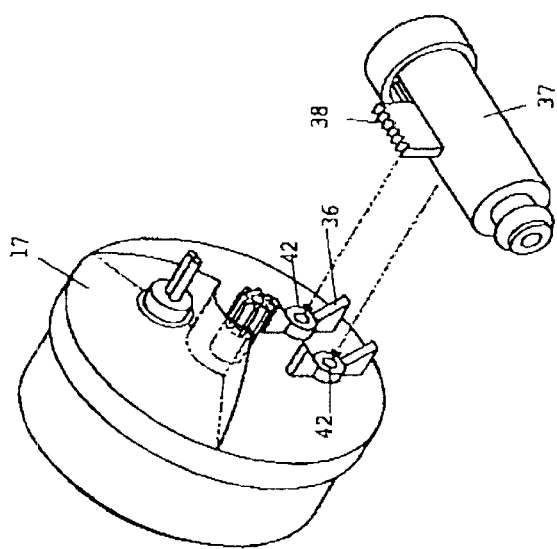
FIG. 7 is a schematic rear perspective partially parts-exploded perspective illustration of the pressure gauge of FIG. 2.

The back part 17 includes an integral bushing 22 through which a shaft 23 extends. A pinion gear 24 is fixed to an externally projecting end portion of the shaft 23, whereas a transparency disk 25 is mounted to the other end portion of the shaft behind the intermediate housing portion 18. A wall 26 of the intermediate portion includes a blind hole 27 to support an end of the shaft 23. The intermediate portion 26 also includes a number of apertures 28 as shown in FIG. 6.

The front part 19 includes a display area 28 also having a number of apertures 29 therein. Situated within or behind the front part 19 are a number of light tubes 30, either formed individually as shown or as an integral moulding. Each tube is made of substantially clear moulded plastics material, or might be translucent or otherwise light-transmissive. Narrow back ends 31 of the light tubes 30 are received within the apertures 28 of the intermediate part 18 whereas wider front portions 32 pass into, adjacent, or completely through apertures 29 in the front part 19. The transparency disk 25 is divided into a number of segments 33, 34 and 35. These might typically be tinted red, green and yellow in a clockwise sense The disk 23 is fixed to the shaft 27 as is the pinion gear 24

The housing parts 17, 18 and 19 a typically glued together or otherwise substantially sealed.

Figure 8:
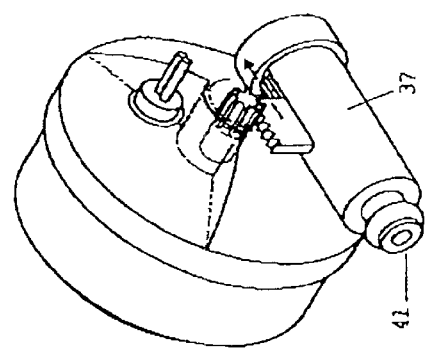
FIG. 8 is a schematic rear perspective illustration of the pressure gauge of FIG. 7.

As shown in FIG. 8, the back part of the housing 17 has a pair of mounting brackets 36 onto which a pneumatic actuator 37 is mounted. This mounting can be by way of screws (not shown) that extent outwardly through holes 42. The pneumatic actuator 37 is a known component and includes a rack 38 attached to an internal plunger 39. The plunger 39 is biased by compression spring 40. A pneumatic line 43 (FIG. 1) extends from a socket 41 on the front of the actuator to the chamber 11. The pneumatic line can be clamped about the O-ring seal 44.

When the chamber 11 is pressurised by reciprocal actuation of the pumping piston 13, pressure increases in the chamber 11 and therefore also in the pneumatic line 43 and pushes the actuator plunger 39 backwards against the force of spring 40. As a result, the rack 38 moves backwards and causes rotation of the pinion gear 24 and the transparency disk 25. If the light globe 20 is switched on, light passing through the light tubes 30 will change colour upon rotation of the disk 25 so that the colour displayed at the front of the various light tubes in the display area 28 will change from aperture-to-aperture 28. As pressure within the chamber 11 diminishes upon depletion of water therefrom, this will be apparent to the user by the colours displayed in the display area 28.

It should be appreciated that modifications and alterations obvious to those skilled in the art are not to be considered as the beyond the scope of the present invention. For example, instead of providing a rotatable disk 25, a straight transparency strip could be attached directly to a plunger 39, instead of providing a rack and pinion arrangement.

What is claimed is:

1. A pressure gauge device for a toy having a pressure chamber, the device comprising:

a housing, a light source mounted to the housing, a coloured transparency mounted movably to the housing, a pneumatic actuator communicating with the chamber and moving the transparency, and a display receiving light from the light source that has massed through the transparency.

2. The pressure gauge of claim 1, wherein the transparency is a multi-coloured disk.

3. The pressure gauge of claim 2, wherein the disk is mounted upon a shaft.

4. The pressure gauge of claim 3, wherein the shaft has a pinion gear mounted thereon and the pneumatic actuator has a spring-biased plunger having a rack moving therewith and in mesh with the pinion gear.

5. The pressure gauge of claim 1, wherein the display has associated with it a number of light-transmission tubes extending from alongside the transparency.

6. The pressure gauge of claim 1, wherein the housing includes a back part to which the light source and disk are mounted, an intermediate part adjacent to the transparency, and a front part including the display.

7. The pressure gauge of claim 6, wherein the pneumatic actuator is mounted to the back part externally of the device.

* * * * *